United States Patent [19]

Erwin

[11] 4,142,448

[45] Mar. 6, 1979

[54] RACK AND PINION POWER STEERING GEAR

[75] Inventor: Louis R. Erwin, Livonia, Mich.

[73] Assignee: The Bendix Corporation, Southfield, Mich.

[21] Appl. No.: 765,499

[22] Filed: Feb. 3, 1977

[51] Int. Cl.² .............................................. F15B 9/10
[52] U.S. Cl. ...................................... 91/372; 91/378; 74/388 PS; 74/498; 180/148
[58] Field of Search ................. 91/373, 372, 371, 370, 91/434, 378; 74/498, 388 PS; 180/148

[56] References Cited

U.S. PATENT DOCUMENTS

| | | | |
|---|---|---|---|
| 2,941,514 | 6/1960 | Jablonsky | 91/372 |
| 3,011,483 | 12/1961 | Frick et al. | 91/372 |
| 3,930,436 | 1/1976 | Hedenberg | 91/49 |

FOREIGN PATENT DOCUMENTS

L20902 12/1956 Fed. Rep. of Germany ............ 91/370

*Primary Examiner*—Paul E. Maslousky
*Attorney, Agent, or Firm*—Paul David Schoenle; Ken C. Decker

[57] ABSTRACT

A rack and pinion power steering gear assembly includes a housing with a longitudinal bore and a sleeve slidably mounted in the longitudinal bore. The rack is slidably mounted within the sleeve and cooperates with the sleeve to communicate an inlet port to either a first working chamber or a second working chamber when the rack moves from a first position to a second position. The rack and sleeve also cooperate with each other to define a pair of feedback chambers and the rack moves from a first position to communicate the inlet port with the first feedback chamber to a second position to communicate the inlet port with the second feedback chamber.

2 Claims, 8 Drawing Figures

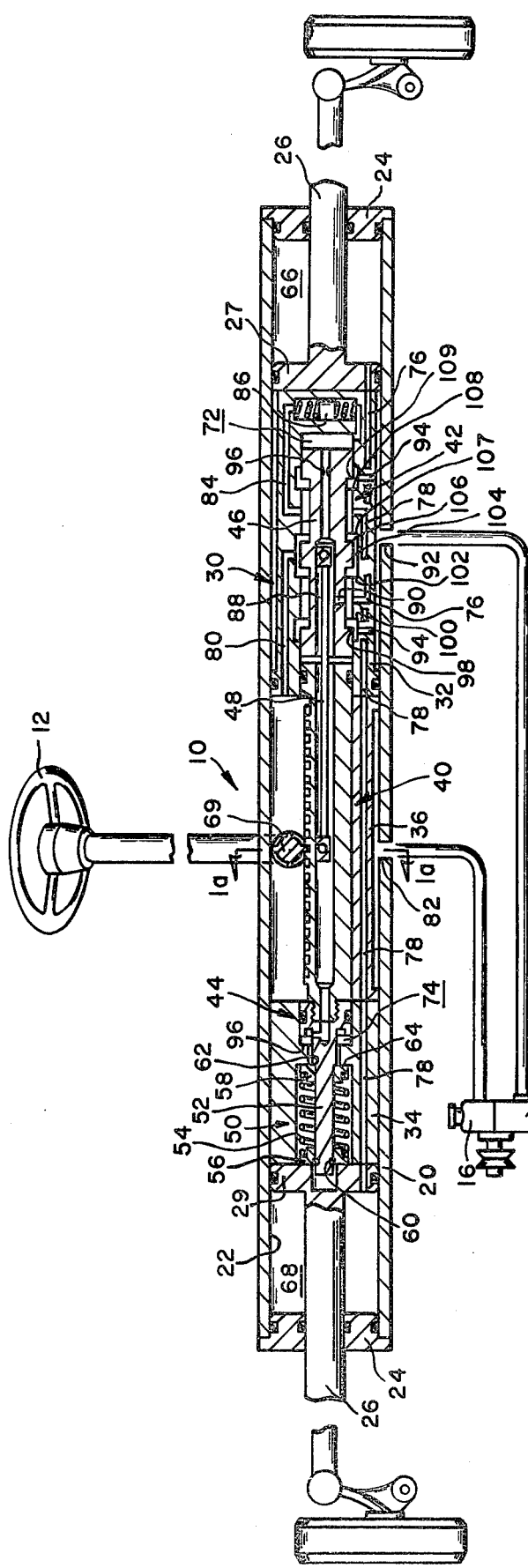

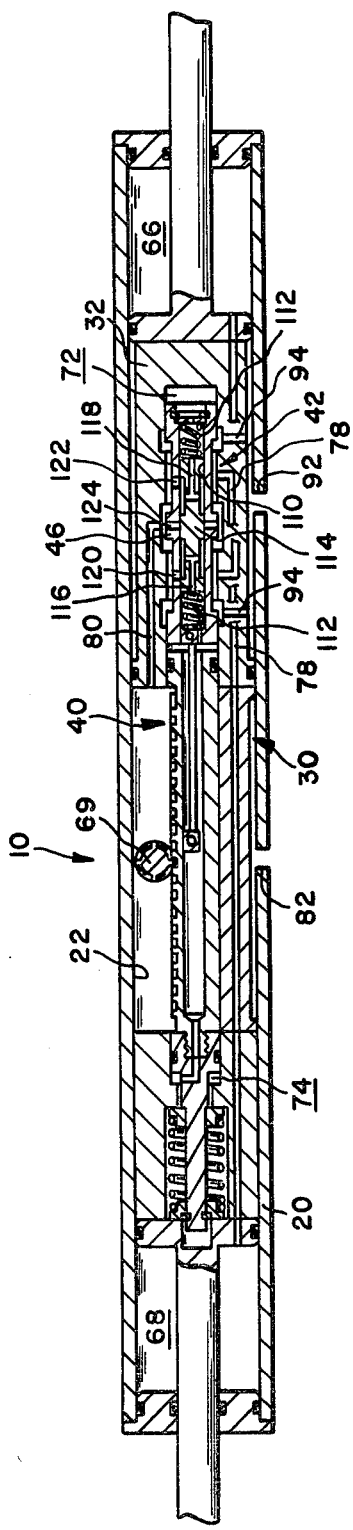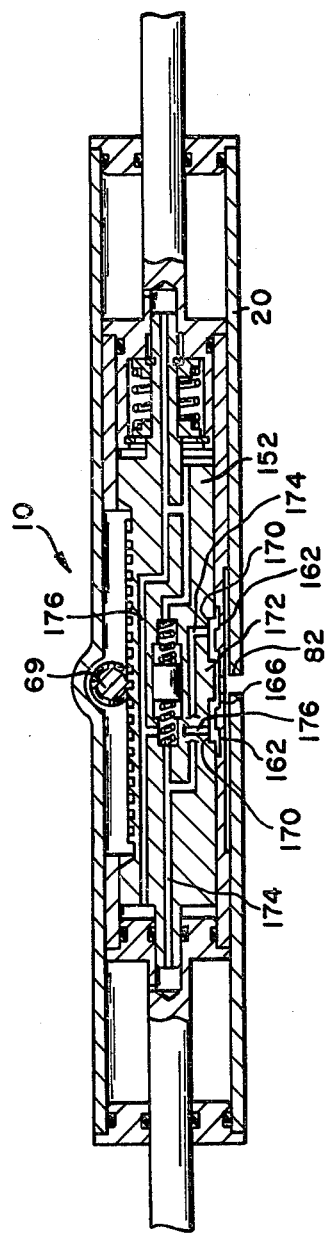

RACK AND PINION POWER STEERING GEAR

BACKGROUND OF THE INVENTION

Power steering assemblies generally provide a rotary hydraulic valve which is operatively connected to a steering shaft. A rack engages the steering shaft and is slidably mounted in a housing bore and the rotary hydraulic valve communicates pressurized fluid to the housing bore in order to assist the movement of the rack in the housing bore when the steering shaft is rotated.

The rack extends from the housing bore to operatively engage a steerable wheel such that rotation of the steering shaft moves the rack within the housing bore in order to turn the steerable wheel.

SUMMARY OF THE INVENTION

The present invention relates to a rack and pinion power steering assembly wherein the rack cooperates with a sleeve that is slidably mounted in a housing bore in order to communicate pressurized fluid to a pair of working chambers which are defined by the sleeve and housing bore. The sleeve includes a pair of rods that extend from the housing to operatively engage a steerable wheel.

The rack cooperates with the sleeve to define a pair of feedback chambers which communicate with the inlet port when a corresponding working chamber communicates with the inlet port. Pressurized fluid from the inlet port is communicated to one working chamber, to urge the sleeve to move in one direction while pressurized fluid from the inlet port is also communicated to a corresponding feedback chamber to urge the rack to move in an opposite direction to that of the sleeve.

In a specific embodiment of the invention the rack is connected to a spool valve which is slidingly mounted in a stepped bore in the sleeve to cooperate with lands on the stepped bore to communicate the inlet port with the working chambers and corresponding feedback chambers. Moreover, the sleeve includes a portion, remote from the stepped bore, in which a centering spring is carried to bias the spool valve to a neutral position.

in a modified embodiment of the invention the rack itself comprises a spool valve with a pair of passages therethrough, which passages selectively communicate the working chambers and corresponding feedback chambers with the inlet port, depending on the position of the rack spool valve within the sliding sleeve.

DESCIPTION OF THE DRAWINGS

FIG. 1 is a schematic view of a rack and pinion power steering system showing the rack and pinion gear assembly in cross section;

FIG. 1a is a cross-sectional view taken along A—A of FIG. 1;

FIG. 2 is a cross-sectional view of a modified rack and pinion gear assembly similar to FIG. 1;

FIG. 3 is a cross-sectional view of a modified rack and pinion gear assembly similar to FIG. 1;

FIG. 5 is a cross-sectional view of a modified rack and pinion gear assembly similar to FIG.4

DETAILED DESCRIPTION

Figure 4:
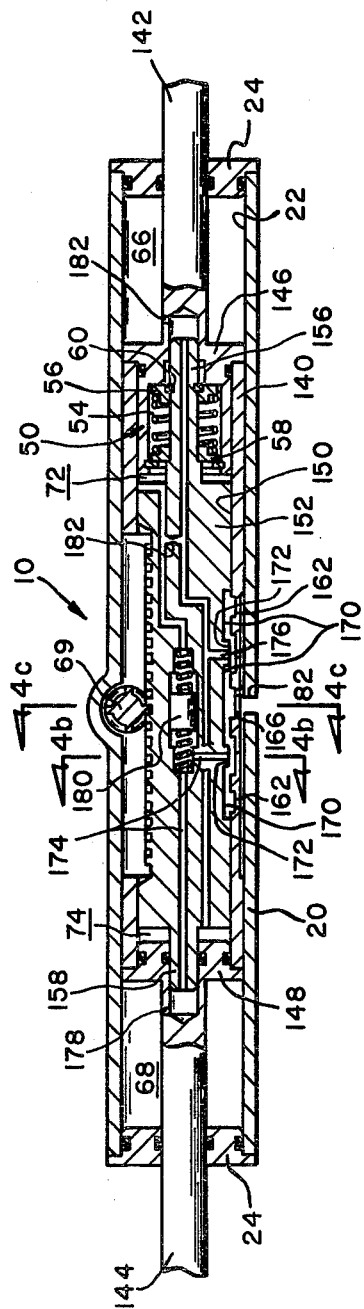
FIG. 4 is a cross-sectional view of a rack and pinion gear assembly wherein the rack comprises a spool valve.
Figure 4C:
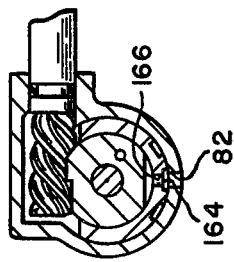
FIG. 4c is a cross-sectional view taken along C—C of FIG. 4.

Referring now to the drawings wherein like numerals refer to similar parts, a rack and pinion power steering assembly generally indicated at 10 includes a steering wheel 12 which is disposed within a vehicle compartment for turning by a vehicle operator. The assembly 10 is operatively connected to a pair of steerable wheels 14 and is in communication with a reservoir 16 and a pump 18 via suitable conduit means.

A cylindrical housing 20 is secured to a portion of the vehicle and includes a bore 22 extending therethrough with plugs 24 closing the ends of the bore 22. Extending through openings in the plugs 24, a pair of rods 26 operatively connect with the steerable wheels 14 to pivot the wheels to steer or guide the vehicle during movement of the vehicle.

In accordance with the invention a sleeve 30 is slidably mounted in the housing bore 22. The sleeve 30 includes a first portion 32 and a second portion 34 with a connecting portion 36 therebetween. In addition, the sleeve 30 is fixed to the end flanges 27 and 29 of the rods 26 and the connecting portion 36 is fixed to the first and second portions so that the sleeve 30 including the pair of rods 26 moves as a unit relative to the bore 22.

A rack 40 is slidably mounted in a stepped bore 42 within the sleeve first portion 32 and in a stepped bore 44 within the sleeve second portion 34. The rack includes a spool valve 46 slidably mounted within the stepped bore 42 and the spool valve 46 is joined to the rack 40 by means of a thin connecting rod 48 so that the rack and spool valve move as one.

The end of the rack 40, slidably mounted within the sleeve second portion 34, includes a centering means 50 comprising a projection 52 and a spring 54. A spring retainer 56 is carried at the left end of the projection 52 and a similar retainer 58 is biased against a transverse shoulder 62 on the projection to yieldably dispose the spring 54 therebetween. A clip 60 limits the movement of the spring retainer 56 so that movement of the rack 40 to the right or left viewing FIG. 1, compresses the spring 50 between the spring retainer 56 and the spring retainer 58 to bias the rack to a neutral position. At the neutral position of rack 40 and spool valve 46, fluid is transmitted through the housing 20 without imparting any axial forces on the sleeve or rack.

Movement of the rack 40 within the sleeve stepped bores 42 and 44 is provided by a pinion shaft 69 which extends into the housing bore 22 to engage a set of teeth on the rack in a manner well known in the art. The pinion shaft 69 is operatively connected with the steering wheel 12 whereby turning of the steering wheel 12 rotates the pinion shaft 69 to impart axial movement of the rack within the stepped bore 42 and 44 of the sleeve 30.

The sleeve assembly 30 cooperates with the housing 20 and the plugs 24 to define a pair of working chambers 66 and 68 while the rack assembly 40 cooperates with the stepped bore 42 of the first sleeve portion 32 and the stepped bore 44 of the second sleeve portion 34 to define a pair of feedback chambers 72 and 74, respectively. A passage 76 extends from the stepped bore 42 to the working chamber 66 and a passage 78 extends from the stepped bore 42 to the working chamber 68 via the connector sleeve 36 and the second sleeve portion 34. A return passage 80 communicates an intermediate groove of the stepped bore 42 with an outlet port 82 which in turn communicates with the reservoir 16.

Pursuant to the invention a feedback passage 84 communicates the stepped bore 42 with the feedback chamber 72 via a spool 86 within passage 84. The spool 86 is spring centered within the passage 84 to transmit pressure variations upstream thereof to the feedback chamber 72. A bleed orifice 96 vents the feedback chamber 72 to a passage 88 which also communicates with the stepped bore 42 via passage 90. The passage 88 receives the connecting rod 48 with a clearance therebetween to provide for fluid flow around the connecting rod and extends through the rack 40 to communicate with the feedback chamber 74.

Fluid is communicated to the stepped bore 42 from the pump 18 through an inlet port 92 in the housing 20 and through passages 94 that open to outer grooves within the stepped bore 42.

MODE OF OPERATION

When the vehicle operator wants to turn to the right or left he rotates the steering wheel 12 which in turn rotates the pinion shaft 69 to move the rack 40 axially within the sleeve 30. For example, when the rack 40 is moved an increment to the right, viewing FIG. 1, pressurized fluid from pump 18 is communicated to the inlet port 92 and through the right and left passages 94 to the stepped bore 42. In a rack-centered condition, the flow through the two passages 94 would be closely matched and flow would be toward the increased diameter portion of bore 42 connected to passage 80, and thence to port 82 and back to reservoir 16. In the rack-uncentered condition (increment to the right), flow from left passage 94 to the center increased diameter portion of bore 42 is impeded more than before by closer proximity of edges 98 and 100 while edges 102 and 104 are farther apart. Flow from right passage 94 between edges 108 and 109 is made easier but flow between edges 106 and 107 is less easy due to closer spacing. The total available flow area from port 92 to port 82 is thus restricted, causing the output pressure of the constant flow pump 18 to increase, thereby increasing pressure at port 92.

A portion of this pressure increase appears in the space between edges 107 and 108 and is communicated to chamber 68 via passage 78 and to chamber 72 indirectly via passage 84 and piston 86. At the same time, the increased spacing of edges 102 and 104 and restriction of the spacing of edges 98 and 100, tends to make it easier for fluid to flow from chamber 66 via passages 76, and 80 to port 82. This reduction in pressure is also communicated to chamber 74 via passages 90 and 88. Chambers 72 and 74 are connected by orifice 96. Consequently, a pressure difference is created between chambers 66 and 68, thus creating a force on the entire assembly sliding in bore 22 which tends to move the sliding assembly to the right to relieve the pressure. Also, a pressure difference exists between chambers 72 and 74 tending to resist the initially imposed rack movement. Since piston 86 has limited travel, a persisting pressure difference between chambers 66 and 68 will cause piston 86 to either reach a travel limit or a position where the springs associated with piston 86 balance the applied pressure difference. Orifice 96 will then allow chambers 72 and 74 to reach the same pressure.

This arrangement is known as "dynamic pressure feedback" and is utilized to enhance the stability of the follow-up action of the assembly sliding in bore 22 relative to the imposed motion of the rack assembly 40.

Dynamic pressure feedback tends to resist sudden driver movement of the steering wheel and also tends to produce "road feel" as an imposed vehicle wheel movement also results in a transient pressure acting on the rack assembly 40, while at the same time the quasistatic steering wheel torque to maintain an appreciable pressure difference between chambers 68 and 66 is dependent only on the centering spring gradient and the relative valve movement required to get a given pressure differential.

Left steering produces an analogous set of conditions but with the pressure differences appropriately reversed. For example, when the rack 40 is moved an increment to the left, viewing FIG. 1, pressurized fluid from the pump 18 is communicated to the inlet port 92 to increase communication through the opening between edges 98 and 100 while decreasing communication through the opening between edges 108 and 109. The edges 98 and 100 separate from each other when the rack is moved an increment to the left and the edges 108 and 109 approach each other. Consequently, pressurized fluid entering the left passage 94 is communicated to the chamber 66 via passage 76 and to the chamber 74 via passages 90 and 88. At the same time, pressure chamber 68 is opened to port 82 via passages 78 and 80 and chamber 72 is exposed to port 82 via piston 86 and passage 84 which is opened to passage 80 upon movement of the rack 40 to the left. As a result, the pressurized fluid communicated to the pressure chamber 66 causes the sliding assembly to move to the left while the pressurized fluid communicated to chamber 74 will oppose movement of the rack to the left, thereby providing feedback to a driver.

An alternate mode which produces equivalent or better improvements in stability but which results in a steering wheel (12) torque proportional to the pressure difference in chambers 66 and 68, omits piston 86 and closes orifice 96. This is known as "pressure feedback" or "direct pressure feedback". The location of the pressure feedback mechanism related to the pinion is believed to be advantageous for either "pressure feedback" or "dynamic pressure feedback", vs. known art which places the feedback on the steering wheel side of the pinion.

If the pump fails or the rack and pinion valve fail to communicate pressurized fluid to the appropriate working chamber, the rack 40 is movable axially upon rotation of the pinion shaft 69 to engage either the end wall of the feedback chamber 72 or the transverse shoulder 96 on the sleeve portion 34 to manually pivot the steerable wheels 14.

In the modified embodiment of FIG. 2 the sleeve portion 32 includes one inlet passage 94 communicating the inlet port 92 with the stepped bore 42. Consequently, the passage 80 communicates the outer grooves of the stepped bore 42 with the outlet port 82 and the inner lands of the stepped bore 42 include passages 76 and 78 that communicate pressurized fluid, respectively, to either working chamber 66 or working chamber 68. Moreover, the passage 90 in the spool valve 46 of FIG. 2 is on the right side of the middle land of the spool valve 46 and the passage 84 communicating indirectly with the feedback chamber 72 branches off of the passage 78.

The rack and pinion gear assembly of FIG. 2 operates in the same manner as that in FIG. 1. Pressurized fluid from the pump 18 is communicated via the valve arrangement between the rack 40 and the sleeve 30 to either working chamber 66 or 68 and to a corresponding feedback chamber 74 or 72.

In the modified embodiment of FIG. 3 the spool valve 46 of the rack 40 is provided with a bore 110. Slidably mounted within the bore 110 and centered by a pair of springs 112 is a piston 114. Passages 116 and 118 within the piston communicate the bore 110 with the feedback chambers 74 and 72, respectively, while inlet passages 120 and 122 communicate the stepped bore 42 with the bore 110. Centrally located on the spool valve 46 of FIG. 3 are relief passages 124 that cooperate with passage 80 to vent either feedback chamber 72 or 74 to the outlet port 82 when the pressure therein urges the piston 114 to move whereby either of the inlet passages 120 or 122 is closed by the piston 114 and either of the passages 116 or 118 is open to the relief passages 124. Consequently, the piston 114 communicates pressurized fluid to the feedback chambers when the spool valve 46 is moved relative to the sleeve 30 and also responds to the pressure in the feedback chambers to vent the same to the outlet port 82 when the pressure in the chambers is above a predetermined value, dependent on the spring constant of springs 112.

When the rack and spool valve 40 are moved to the right, viewing FIG. 3, the right inlet passage 94 communicates pressurized fluid to the stepped bore 42, the left inlet passage 94 being closed by the right movement of the spool valve 46. From the stepped bore 42 the pressurized fluid passes through passage 78 to working chamber 68 and through inlet passage 122 to the bore 110. From the bore 110 pressurized fluid enters the passage 118 and communicates with the feedback chamber 72. If the pressure in the feedback chamber 72 relative to chamber 74 exceeds a predetermined value, this excess pressure acts against the left spring 112 to move the piston 114 to the left relative to the spool valve 46 until the right larger diameter portion of the piston 114 closes the inlet passage 122 and the right smaller diameter portion of the piston 114 containing passage 118 opens to the relief passage 124. Consequently, excess pressure within feedback chamber 72 flows through the relief passages 124 to the stepped bore 42 and through the passage 80 to the outlet port 82. When the pressure in the feedback chamber is sufficiently reduced, the left spring 112 urges the piston 114 to the right to again open the feedback chamber 72 to pressurized fluid.

Turning to FIG. 4, the rack and pinion steering gear 10 includes a cylindrical housing 20 and a cylindrical sleeve 140 slidably mounted in the housing bore 22. Closing the open ends of the cylindrical sleeve 140 are a pair of rods 142 and 144 with respective end flanges 146 and 148 sealingly and fixedly connected to the sleeve 140.

Slidably mounted within the sleeve bore 140 is a combined rack and value 152 which is engaged with the pinion shaft 69 for axial movement within the sleeve bore 150 and within the housing bore 22. The cylindrical housing 20 includes a pair of plugs 24 that close the open ends thereof and these plugs cooperate with the housing 20 and the rod end flanges 146 and 148 to define a pair of respective working chambers 66 and 68. The flanges 146 and 148 also cooperate with the rack 152 to define a pair of respective feedback chambers 72 and 74.

Integrally formed with the rack 152 are a pair of extensions 156 and 158 which are slidably received in bores in the respective flanges 146 and 148. A centering means 50 is disposed between the extension 156 and the flange 146. The centering means 50 includes a spring 54 that is compressed when the rack 152 is moved away from the neutral position illustrated in FIG. 4

Figure 4B:
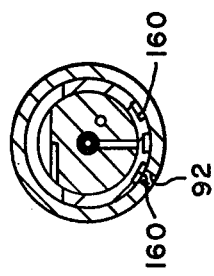
FIG. 4b is a cross-sectional view taken along B—B of FIG. 4.

Fluid communication through the housing 20 is provided by an inlet port 92, see FIG. 4b, and an outlet port 82. The inlet port 92 communicates with an axial slot 160 on the outer surface of the sleeve 140 which in turn communicates with the arcuate groove 162 on the inner surface of the sleeve 140. The outlet port 82 communicates with the axial slot 164 on the outer surface of the sleeve 140 and with the arcuate groove 166 on the inner surface of the sleeve 140. Segmental grooves at 170 on the rack 152 define segmental lands at 172 which include passages 174 and 176. Passage 174 communicates with the working chamber 68 via the bore in the flange 148 and an opening 178 and communicates indirectly via a spring centered spool 180 with the feedback chamber 72. Passage 176 communicates with the working chamber 66 via the bore in the flange 146 and an opening 182 and communicates directly with the feedback chamber 74.

When the rack 152 is moved an increment to the right viewing FIG. 4, the passage 176 is communicated with the outlet port 82 in view of the engagement between the segmental lands 172 and corresponding segmental ridges on the sleeve 140 and the passage 174 is communicated with the arcuate groove 162 via the left segmental groove 170, the axial slot 160 and the inlet port 92. Consequently, when the rack 152 is moved to the right, pressurized fluid is communicated to the working chamber 68 to assist in moving the sleeve 140 to the right. In addition, pressurized fluid is communicated indirectly via spool 180 to the feedback chamber 72. Either dynamic pressure feedback or direct pressure feedback (by removal of piston 180) can be used and orifice 182 is provided in the same manner as orifice 96 in FIG. 1. Moreover, the inlet port 92 is communicated via one or both of the slots 170 and holes in sleeve 140 so that both slots 160 (FIG. 4b) are at supply pressure.

When pinion 69 transmits motion to rack 152, separating forces necessarily exist, tending to force rack 152 against the inside of sleeve 140 and sleeve 140 against bore 22. However, this is the very time that port 92 pressure is high, the pressure rise somewhat proportional to the pinion-to-rack separating force. Pressure in grooves 160 and in slots 170 tends to counter the separating force and reduce friction of the components involved. Also, to the extent that clearances permit, the rack tends to be held in tight mesh with the pinion, which is favorable to proper gear tooth action, eliminating backlash and promoting smooth steering action. Clearances prohibit large movements of rack 152 relative to sleeve 140 and sleeve 140 relative to bore 22 so it is recognized that pinion 69 must be initially within some narrow tolerance of a zero-backlash fit for effective use of the pressure method of force balancing described.

FIG. 5 shows a modification of FIG. 4 wherein the passages 174 and 176 are disposed in respective segmental grooves 170 which are separated from each other by a segmental land 172. The rack and pinion steering gear of FIG. 5 operates in the same manner as the gear of FIG. 4.

In conclusion, the present invention provides a rack and pinion power steering gear 10 in which the the valve mechanism is contained within a generally cylindrical housing 20. The valve mechanism comprises a rack 40 or 152 and a sleeve 30 or 140 which is slidably mounted in the housing 20. The rack and sleeve cooperate to communicate pressurized fluid to working chambers wherein the pressurized fluid urges the sleeve to move to thereby pivot a steerable wheel.

Although the present invention is illustrated in several embodiments, additional changes and/or modifications are possible by one skilled in the art and these variations are intended to be covered by the scope of the present invention as measured by the appended claims.

I claim:

1. A rack and pinion steering gear comprising:

a housing having a bore therein;

a pair of rods extending from said housing to operatively engage a pair of steerable wheels;

a sleeve slidably mounted in said bore and cooperating with said pair of rods to move in unison therewith, said pair of rods cooperating with said housing to define within said bore a pair of working chambers at opposite ends of said sleeve;

an inlet port communicating pressurized fluid to said bore; and a rack slidably mounted in said sleeve and defining with said sleeve a pair of feedback chambers at opposite ends of said rack, said rack being movable by a pinion in one direction and cooperating with said sleeve to communicate said inlet port with one of the working chambers whereby the pressure therein moves said sleeve in said bore and also cooperating with said sleeve to communicate said inlet port with one of the feedback chambers whereby the pressure therein opposes the movement of said rack in the one direction, said rack being movable by the pinion in the other direction and cooperating with said sleeve to communicate said inlet port with the other working chamber whereby the pressure therein moves said sleeve in said bore and also cooperating with said sleeve to communicate said inlet port with the other feedback chamber whereby the pressure therein opposes the movement of said rack in the other direction;

said sleeve including a first portion slidably engaging said bore at one end of said rack and a second portion spaced from said first portion and slidably engaging said bore at the other end of said rack, and said rack including a valve member which is movably disposed within said sleeve first portion.

2. In a rack and pinion steering gear for a vehicle having a pressurized fluid source, a housing secured to a portion of the vehicle, said housing defining an axially extending bore therein, a sleeve slidably mounted in said bore, a rack slidably mounted in said sleeve, a pinion extending transversely into said housing bore and engaging said rack to impart movement to said rack upon rotation of said pinion and an inlet port opening to said housing bore, said rack being movable relative to said sleeve and cooperating therewith to communicate the pressurized fluid source to said housing bore via said inlet port whereby the pressurized fluid in said housing bore urges said sleeve to move within said housing bore, said sleeve comprising a first portion and a second portion which are slidably engaging said bore and spaced from each other said first portion cooperating with said rack to communicate said inlet port to a working chamber, said second portion carrying a centering means engaging said rack, and said pinion extending transversely into said axially extending housing bore to engage said rack at a position spaced from and between said first and second portions.

* * * * *